(12) United States Patent
Böckem et al.

(10) Patent No.: US 10,640,209 B2
(45) Date of Patent: May 5, 2020

(54) FLYING SENSOR

(71) Applicant: LEICA GEOSYSTEMS AG, Heerbrugg (CH)

(72) Inventors: Burkhard Böckem, Jonen (CH); Jürgen Dold, Sempach (CH); Simon Mark, Thal (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 289 days.

(21) Appl. No.: 15/727,629

(22) Filed: Oct. 8, 2017

(65) Prior Publication Data
US 2018/0099744 A1 Apr. 12, 2018

(30) Foreign Application Priority Data

Oct. 7, 2016 (EP) ..................................... 16192915
Sep. 21, 2017 (EP) ..................................... 17192472

(51) Int. Cl.
*B64C 39/02* (2006.01)
*G01S 17/42* (2006.01)
(Continued)

(52) U.S. Cl.
CPC .......... *B64C 39/024* (2013.01); *G01S 7/4808* (2013.01); *G01S 7/4813* (2013.01);
(Continued)

(58) Field of Classification Search
CPC ..... B64C 39/024; G01S 7/4817; G01S 17/42; G01S 17/89; G01S 17/933; G01S 7/4808;
(Continued)

(56) References Cited

U.S. PATENT DOCUMENTS

2012/0267472 A1 10/2012 Pratzovnick et al.
2014/0071234 A1 3/2014 Millett
(Continued)

FOREIGN PATENT DOCUMENTS

AU 2016 201 290 A1 9/2016
CN 202600150 U 12/2012
(Continued)

OTHER PUBLICATIONS

Schneider et al., "Fast and effective online pose estimation and mapping for UAVs," 2016 IEEE International Conference on Robotics and Automation, pp. 4784-4791. (Year: 2016).*
(Continued)

*Primary Examiner* — Daniel L Murphy
(74) *Attorney, Agent, or Firm* — Maschoff Brennan

(57) ABSTRACT

A flying sensor comprising an unmanned aerial vehicle (UAV) and at least one profiler mounted on the UAV, the profiler comprising a base, a scanning unit for providing (LiDAR) data, the scanning unit mounted on the base and comprising a shaft carrying a deflector and being mounted in the scanning unit and rotatable, a transmitter transmitting a transmission beam, a first receiver configured for receiving a first reception beam reflected from the setting via the deflector, and an electric port configured for connecting the profiler to the UAV, and comprising a data interface and a power interface, and wherein the UAV comprises a visual sensor providing visual data, and comprising one or more cameras, a pose sensor for providing pose data, and a computer to compute a 3D point cloud based on the LiDar data and a Simultaneous Localisation and Mapping (SLAM) algorithm using the visual and pose data.

16 Claims, 3 Drawing Sheets

(51) Int. Cl.
  *G01S 17/89* (2020.01)
  *G01S 7/481* (2006.01)
  *G01S 7/48* (2006.01)
  *G05D 1/00* (2006.01)
  *G01S 17/933* (2020.01)
  *G01S 17/86* (2020.01)

(52) U.S. Cl.
  CPC ............ *G01S 7/4817* (2013.01); *G01S 17/42* (2013.01); *G01S 17/86* (2020.01); *G01S 17/89* (2013.01); *G01S 17/933* (2013.01); *G05D 1/0094* (2013.01)

(58) Field of Classification Search
  CPC ...... G01S 7/4813; G01S 17/023; G01S 17/86; G05D 1/0094
  USPC ........................................................ 356/5.01
  See application file for complete search history.

(56) References Cited

U.S. PATENT DOCUMENTS

| | | | |
|---|---|---|---|
| 2014/0111812 A1 | 4/2014 | Baeg et al. | |
| 2014/0132600 A1 | 5/2014 | Shimoyama et al. | |
| 2014/0180914 A1* | 6/2014 | Abhyanker | G01C 1/00 705/39 |
| 2016/0033643 A1 | 2/2016 | Zweigle et al. | |
| 2016/0291136 A1 | 10/2016 | Lindskog et al. | |

FOREIGN PATENT DOCUMENTS

| | | |
|---|---|---|
| CN | 104268935 A | 1/2015 |
| WO | 2015189126 A1 | 12/2015 |
| WO | 2016123201 A1 | 8/2016 |

OTHER PUBLICATIONS

"Scan-Copter Commercial brochure". (May 3, 2014). XP055204359. Accessed from http://scan-copter.4d-it.com/SC_datasheet.pdf.
Peter Dorninger, et al. (May 14, 2014). "Scan-Copter 2.0: a product of 4D-IT GmbH & von-oben e.U. High-Quality 3D Documentation supported by UAV Strength by Cooperation 3D Documentation Multimedia Applications Data Processing Sensor Integration UAV Development Professional Photographer Documentation Mutlimedia Productions", XP055204327. Accessed from http://scan-copter.4d-it.com/SC_info.pdf.
European Search Report dated Apr. 10, 2017 in application No. 16192915.3.
Leica Pegasus Two, Leica Geosystems AG, Jun. 2014 (https://leica-geosystems.com/en-us/products/mobile-sensor-platforms/capture-platforms/leica-pegasus_two).
European Search Report in Application No. 3 306 346 dated Mar. 8, 2018.

* cited by examiner

FLYING SENSOR

CROSS-REFERENCE TO RELATED APPLICATIONS

This application claims priority to European Patent Application No. 16192915 filed on Oct. 7, 2016 and European Patent Application No. 17192472, filed on Sep. 21, 2017. The foregoing patent applications are incorporated herein by reference.

FIELD OF INVENTION

The present invention relates to a flying sensor. More particularly, the present invention relates to a flying sensor for capturing topography.

BACKGROUND

For capturing topographies, e.g. for the purpose of surveying, checking or documentation, optical devices are commonly used which work with optical measuring beams for scanning a surface and capturing of the topography by the distance measurement to points on the sensed surface. A suitable scanning device may be a scanner system, in particular a profiler, which allows for capturing a surface structure by guiding a measuring beam in a scanning manner over the surface and by capturing the spatial position of surface points in the scanning area with a distance measurement relating to the points and linking the measurement with angle information gathered at the time of the measuring beam emission. From the angle and distance information, so called range images of the scanned surfaces may be reconstructed.

A profiler for capturing topographies may also be realised by an electro-optical distance meter, which is guided over a surface area in a scanning manner and which may use laser light.

The correlation of the measurement points of the distance meter on the one hand, to the surface to be captured on the other hand, may e.g. take place by overlaying the scanned area with a reference model of the surface.

A laser distance meter as a surface profiler is for example utilised in the "LEICA Pegasus: Two" system of Leica Geosystems AG.

Fields of application of such surface profilers or systems are e.g. the documentation of structures or the surveying of mines and tunnels. In the latter application, gathering a profile of the hollow space, detecting and measuring of surface variations—like cracks, cavities, gravel nests, detachments or water damages, as well as detecting and measuring of infrastructure—like contact wires, poles and traffic lights—are of particular interest.

In linearly passable hollow spaces, such as rooms, corridors, mines, tunnels, canyons or alleys, the profiler is usually mounted to a vehicle in such a way that the scanning movement of the measuring beam—in a first scanning direction—takes place about an axis which is essentially parallel to the direction of movement of the vehicle, wherein the direction of movement of the vehicle is a second scanning direction.

However, in case the ground of said topography is not equipped with an adequate travel way, such as a sealed street or railway tracks, profilers known from prior art are not practicable, or so only under some losses. A similar problem is represented by surveying tasks in canyons, for a vertical surface of a building, or for a wall of rock, wherein a "ground" for linearly guiding the profiler by a vehicle is not available.

SUMMARY

Some embodiments described herein relate to a flying sensor comprising an unmanned aerial vehicle (UAV) and at least one profiler being mounted on the UAV, wherein the at least one profiler comprises a base, a scanning unit configured for providing Light Detection And Ranging (LiDAR) data, the scanning unit mounted on the base and comprising a shaft carrying a deflector, the shaft being mounted in the scanning unit and rotatable about a rotation axis, a first transmitter configured for transmitting a first transmission beam via the deflector towards a setting, a first receiver configured for receiving a first reception beam reflected from the setting via the deflector, and an electric port configured for connecting the profiler to the UAV, said electric port comprising a data interface and a power interface, and wherein the UAV comprises a visual sensor for providing visual data, the visual sensor comprising one or more cameras, a pose sensor for providing pose data, the pose sensor comprising an Inertial Measuring Unit (IMU) and a Global Navigation Satellite System (GNSS) sensor or a Pseudo GNSS sensor, a computer configured to generate a 3D point cloud (P) of the setting based on the LiDAR data and a Simultaneous Localisation and Mapping (SLAM) algorithm using the visual data and the pose data.

The pose sensor may be integrated in one single box, which is modularly mounted on a main body of the UAV. The profiler may be mounted on a main body of the UAV in such a way that a nodal point of the scanning unit is positioned—in a levelled state of the UAV—vertically below a central point of the GNSS sensor. The scanning unit may comprise a second transmitter configured to transmit a second transmission beam via the deflector towards a setting and a second receiver configured to receive a second reception beam reflected from the setting via the deflector, in particular wherein the second transmission beam is transmitted in the opposite direction relative to the first transmission beam.

At least one of the first transmission beam and the second transmission beam is a transmission beam fan, in particular wherein at least one of the first reception beam and the second reception beam is a reception beam fan.

The profiler may further comprise at least one add-on scanning unit configured just as the scanning unit according to the description herein.

The UAV may comprise a plurality of propellers, and an aviation unit configured for providing aviation data, the aviation data comprising data regarding at least one of a height and a velocity of the UAV, and wherein the computer is configured for controlling the propellers based at least on the aviation data and the pose data. The SLAM algorithm may further use the aviation data.

By the base, the profiler may be configured to be mounted on one of an upper side, a lateral side, and a bottom side of a main body of the UAV.

The scanning unit may be mounted to the base by one of a pivot joint, a gimbal joint, and a ball joint, in particular wherein the joint is motorized and controllable by the computer. The flying sensor may further comprise a wireless communication unit, wherein the computer is configured for receiving commands by a remote control via the wireless communication unit, in particular wherein the remote control has a graphical user interface (GUI) configured to show the 3D point cloud and/or a live image of the visual sensor.

The power interface may be configured to provide electric power from a battery of the UAV to the profiler.

The computer may be configured for controlling the propellers further based on the LiDAR data and the visual data.

The computer may be configured for controlling at least one of a landing approach, a collision avoidance, hovering, and automatic height control, based at least in part on the LiDAR data, the visual data and the pose data. The at least one camera of the visual sensor may be embodied as one of a thermal infrared camera, and a hyperspectral camera.

In some embodiments, the computer is configured to colourise the 3D point cloud by use of at least the visual data. Further, the flying sensor may comprise a magnetometer, a compass, an accelerometer, and/or a gyroscope.

In other embodiments, the flying sensor may further comprise a data storage device for storing at least one of the LiDAR data, the visual data, the pose data, the aviation data and the 3D point cloud, the data storage device in particular being ejectable.

BRIEF DESCRIPTION OF THE DRAWINGS

In the following, the invention will be described in detail by referring to exemplary embodiments that are accompanied by figures, in which.

DETAILED DESCRIPTION

Figure 1:
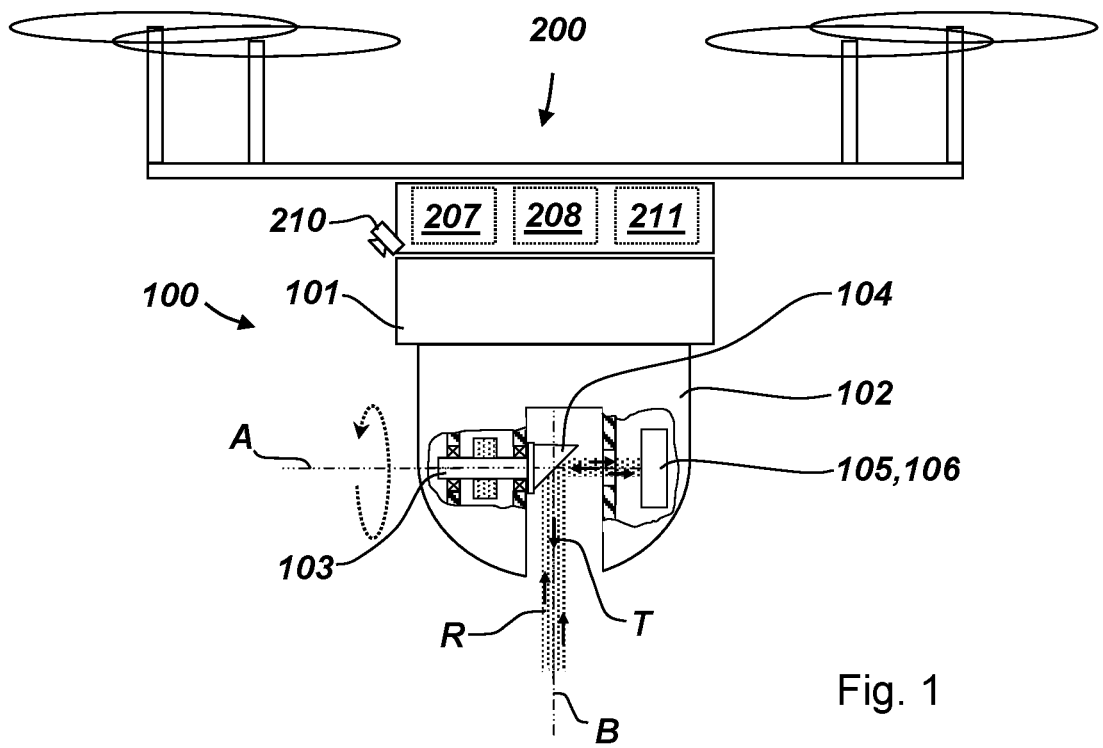
FIG. 1: shows a first embodiment of the profiler according to the invention, and, respectively, a first embodiment of a UAV according to the invention comprising a profiler.

FIG. 1 shows a first embodiment of a flying sensor according to the invention. The flying sensor comprises an unmanned aerial vehicle (UAV) 200 and a profiler 100, which is adapted to be mounted on the UAV. The profiler 100 is configured for operation during a flight of the UAV.

The profiler 100 has a base 101 and a scanning unit 102, which are shown in FIG. 1 as being separate elements. In another embodiment, the base 101 can also be understood as the upper/lower part of the scanning unit 102, such that the profiler and the scanning unit by definition of this application are one structural element. Either way, the base 101 is designed for being attachable to the UAV 200. That could be achieved, for example, by a snap-in construction, or mounting elements like screws, clamps or straps.

The base 101 is connected to the UAV 200 via an electrical port to obtain electric power from a battery of the UAV. By said port, the profiler is also provided with information, such as acceleration data, height data, position data, tilt data, image data, and control data. Thus, the electric port works both as a data interface and as power interface.

The profiler is a passive unit and uses the computer 207, the pose sensor 208, and the visual sensor 210 which are comprised by the UAV. In particular, the UAV also comprises a wireless communication unit 211, which is configured to let the computer 207 receive control commands from a remote control.

The pose sensor 208 comprises an Inertial Measuring Unit (IMU) and a Global Navigation Satellite System (GNSS) sensor, which may also be a Pseudo-GNSS sensor for application of the flying sensor in a tunnel where satellite signals cannot be received directly. The pose sensor 208 is configured to measure the position and orientation of the flying sensor.

The scanning unit 102 comprises a motorised shaft 103 which is mounted and motorised, so that it can be rotated under control of the computer 207 about the axis of rotation A. A beam deflection unit (deflector) 104 is attached to the shaft 103, and is—in the shown embodiment—protruding out of the scanning unit 102. In another embodiment, however, the shown slit of the scanning unit 102 may be sealed by a transparent hood window comprised by the scanning unit 102.

The scanning unit 102 furthermore comprises a first transmitter 105 and a first receiver 106, which are both shown in FIG. 1 as being in one box. The transmitter 105 and the receiver 106 may, however, also be embodied as two separate units, e.g. wherein the transmission beam T and the reception beam R are separated by a beam splitter, which is known in the art.

Generated transmission beams T are directed at the deflector 104 which deflects the transmission beams T towards the setting. The reflected transmission beams T come back from the environment (by reflection from a surface of the setting) as reception beams R and are deflected by the deflector 104 "back" towards the beam receiver 106. By a time-of-flight measuring principle, a plurality of points is measured. With the distance to the points and the angle of the shaft under which they were measured, LiDAR data are generated by the scanning unit 102, which is also referred to as main scanning unit herein. For continuously tracking the angle measurement, the rotation of the shaft 103 is sensed by an angle encoder or e.g. by monitoring the voltage of the motor of the shaft via a hall sensor.

In a further embodiment, the base 101 and the scanning unit 102 may be rotatable relative to each other. For this, either the base 101 or the scanning unit 102 may comprise a motor (and optionally a gearing) to perform such a relative rotation. The rotation may be controlled by the computer 207, and may e.g. be dependent on a current flight position and/or orientation.

The UAV 200 further has a visual sensor comprising a camera 210 which is arranged on the UAV 200. The at least one camera has a defined position and defined orientation relative to the point of origin (nodal point) of the profiler. The data gathered by the visual sensor are one input for a Simultaneous Localisation and Mapping (SLAM) algorithm (process) performed by the computer 207. The other inputs are data gathered by the pose sensor 208 and the LiDAR data gathered by the profiler 100. In a combined SLAM process, a 3D point cloud P of the setting is built up. In particular, the pose data measured by the pose sensor and the visual data of the visual sensor are helping to store the LiDAR points in a correct spatial correlation.

With means of the visual data of the camera 210, the gathered 3D point cloud P may furthermore be coloured or "coated" with texture that has been captured from the topography.

The profiler according to the invention is significantly light in weight compared to generic devices known from prior art, with having a weight of about 300 grams. Such a weight is unmatched in prior art and makes the profiler especially suitable for usage on an UAV. The low weight is specifically advantageous for the UAV-application and is achieved by the profiler being embodied without any CPU, GPU, GNSS, IMU, wireless unit, battery, or camera.

Figure 2:
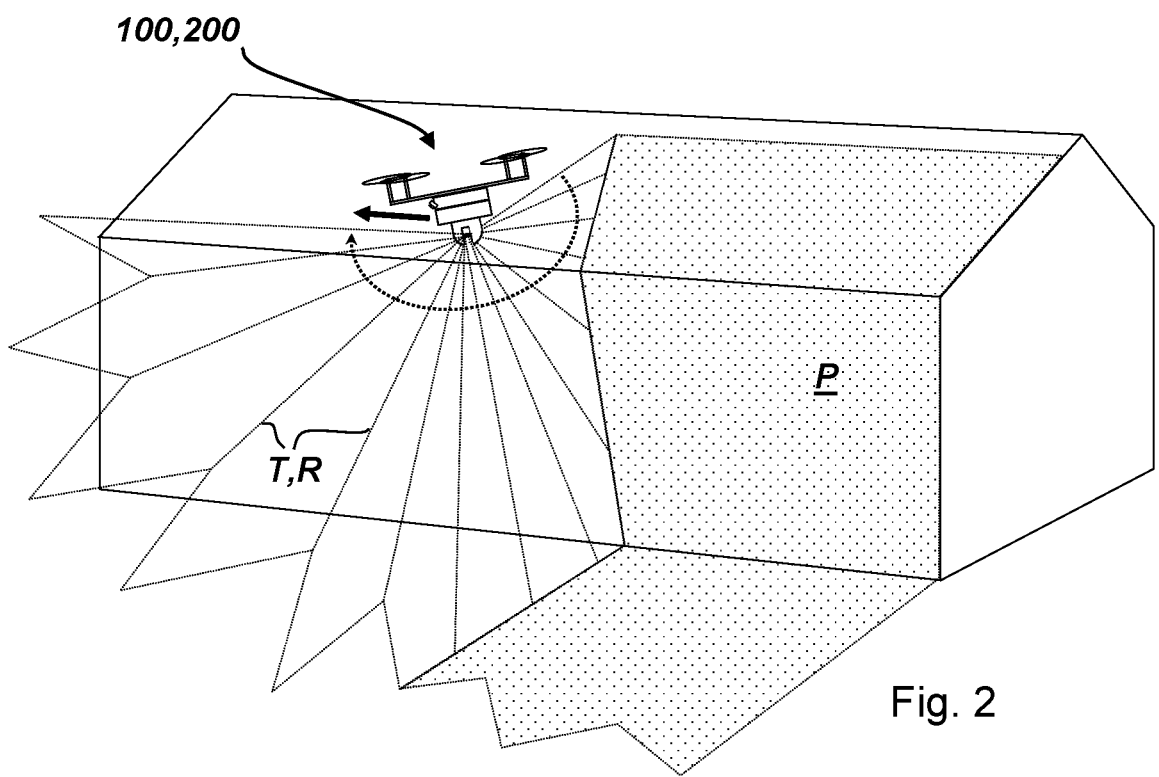
FIG. 2: shows the first embodiment of the profiler according to FIG. 1 during a surveying flight, and, respectively, the first embodiment of the UAV according to FIG. 1.

FIG. 2 shows the first embodiment of the flying sensor shown in FIG. 1, while performing a surveying flight along the façade of a row of houses. Thereby, Light Detection and Ranging (LiDAR) data are recorded having a range of more than 180° with regard to the axis A. Such LiDAR data may be coordinates of the measured single points linked with angle positions of the shaft 103. With the straight arrow, the direction of flight is indicated, and the dashed circular arrow indicates the performed rotation about axis A of a single measuring beam (T, R), i.e. the transmission beam T and the reception beam R are proceeding along the beam axis B, which is rotating. The shown beams (T, R) are actually one beam at different rotatory positions.

Figure 3:
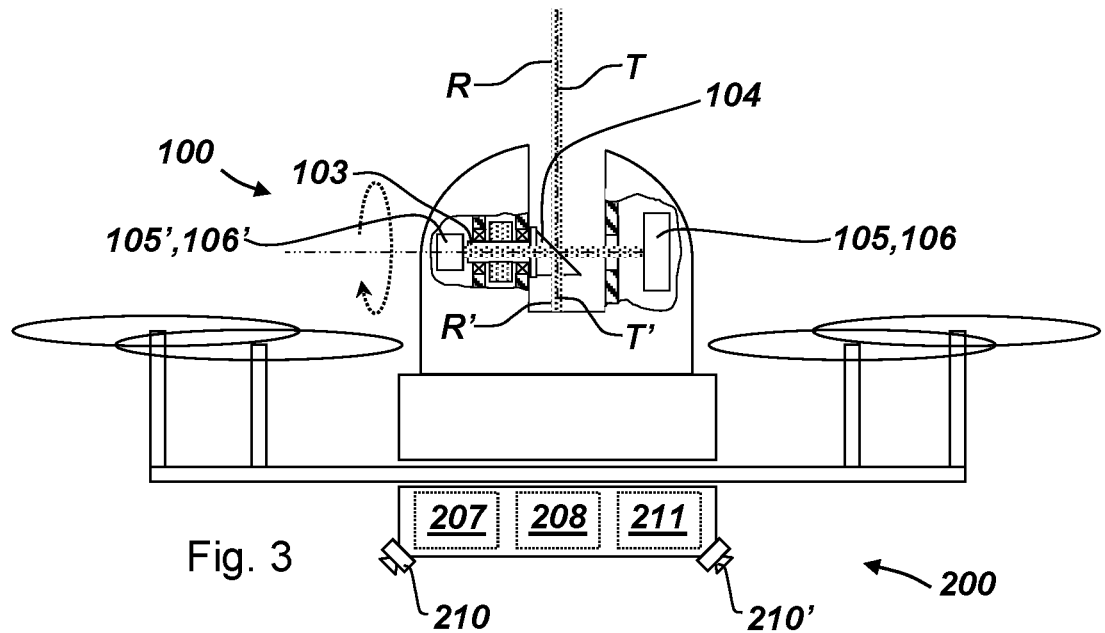
FIG. 3: shows a second embodiment of the profiler according to the invention, and, respectively, a second embodiment of a UAV according to the invention comprising a profiler.

FIG. 3 shows a further embodiment of the flying sensor. This configuration may be useful for scanning ceilings in a building or walls in a tunnel. Accordingly, as is not shown in the figures, the profiler 100 may also be mounted at any lateral side of the UAV 200.

The visual sensor may have more than one camera (210, 210') in order to provide a larger range of view. A camera preferably has a wide angle lens providing very small focal length and therewith a coverage of 120°, or up to 180°, or even more. A range overlap of two cameras may be used to improve the SLAM process and therewith the construction of the 3D point cloud.

The scanning unit of the profiler 100 may furthermore have second transmitter 105' and second receiver 106' which are managing a second measuring beam (second reception beam R', second transmission beam T'), which is guided to the opposite direction relative to the first measuring beam (first reception beam R, first transmission beam T).

The deflector 104 is configured to enable this double side reflection by its inclined surface serving as a mirror from both sides. The shaft 103 and the deflector 104 are hollow for allowing the second measuring beam R', T' to pass through and reach the inner side of said mirror. Once reflected, the second transmission beam T' exits the deflector 104 through an incorporated hole or window and in the same manner, second reception beam R' enters the deflector 104 in order to get reflected back to the second receiver 106'. By simultaneously sending out two measuring beams, the resolution of the obtained 3D point cloud can be increased.

Figure 4:
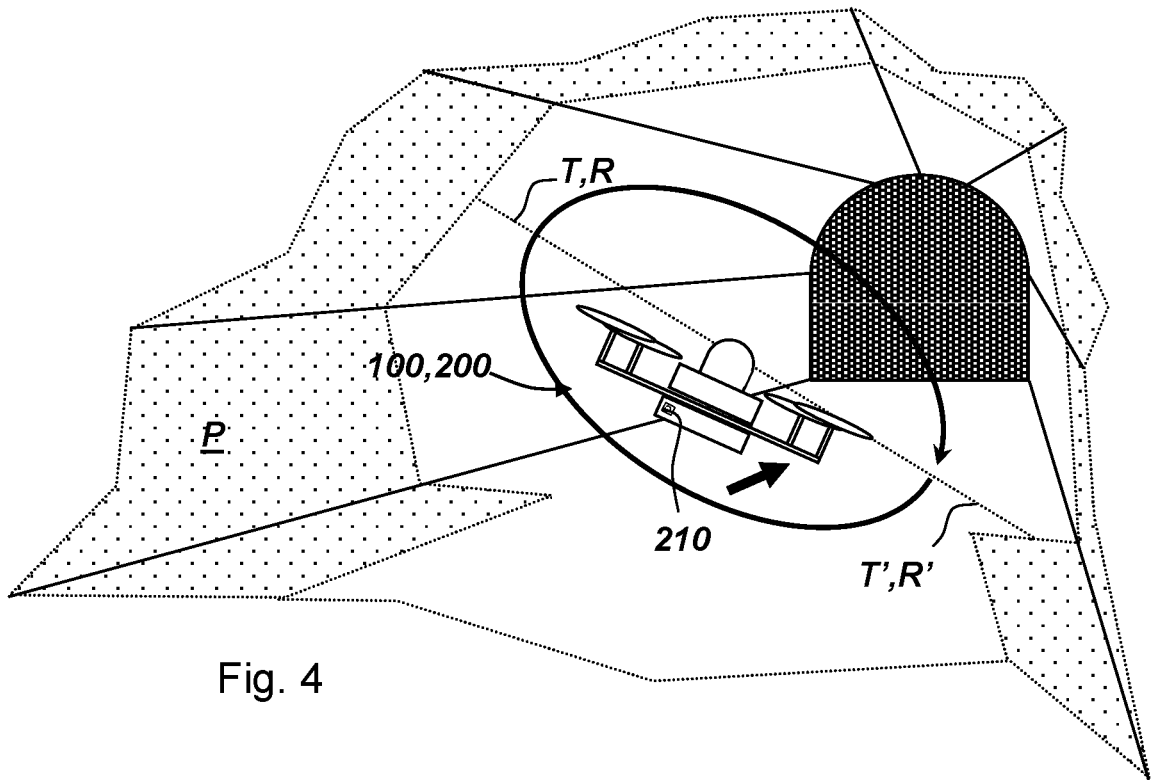
FIG. 4: shows the second embodiment of the profiler during a surveying flight, and, respectively, the second embodiment of the UAV according to FIG. 2.

FIG. 4 shows the flying sensor of FIG. 3 while surveying a tunnel. As is indicated with the point-dashed line, first (T,R) and second (T',R') measuring beams are directed at opposite directions, thereby allowing the scanning unit to collect twice as many points (or the same amount of points in half the time, allowing a faster flying speed of the UAV). The data from the visual sensor, from the pose sensor 108 and from the scanning unit 102 are serving as input for the SLAM process which builds up the referenced point cloud P. The circular arrow indicates the rotation of the two beams. The straight arrow indicates the flight direction of the flying sensor.

Figure 5:
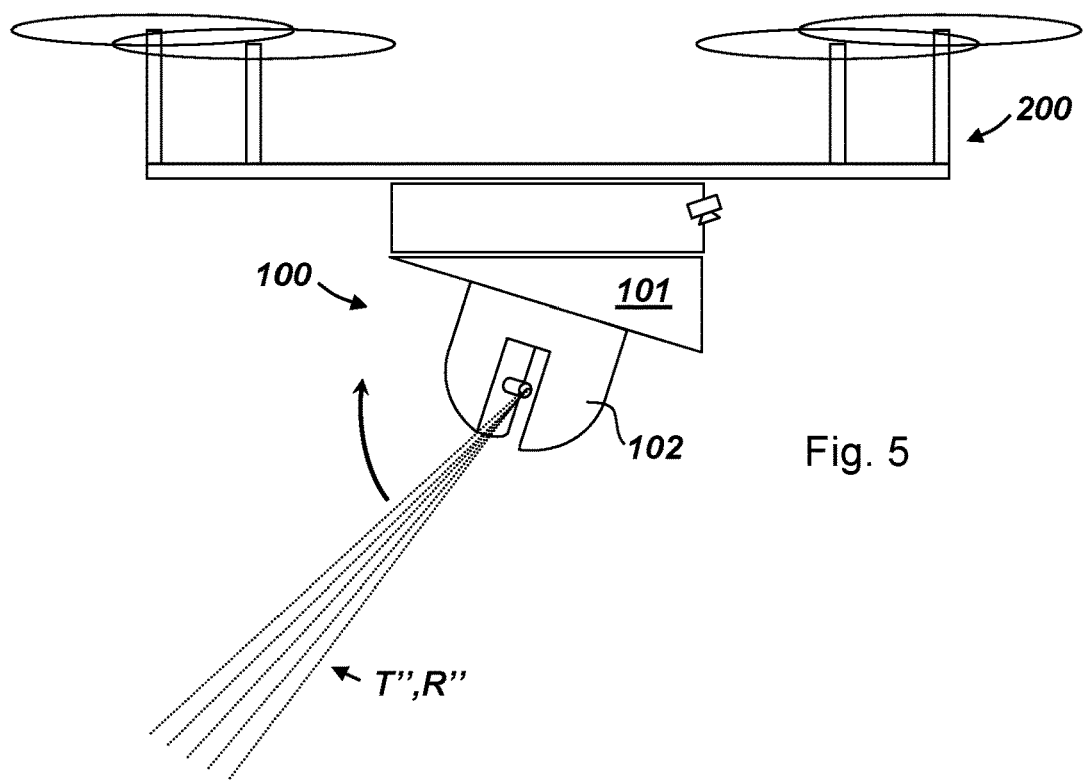
FIG. 5: shows a third embodiment of the profiler according to the invention comprising two scanning units, and, respectively, a third embodiment of the UAV according to the invention comprising two profilers.

FIG. 5 shows another embodiment of the flying sensor according to the invention. The base 101 of the profiler 100 is designed to let the scanning unit 102 have an inclined orientation with respect to the UAV 200. This can, for example, compensate the tilted orientation of the UAV relative to the ground during a horizontal flight, in order to achieve an orthogonal orientation of the profiler relative to the ground at a specific flight velocity causing a specific inclination of the UAV (compare to FIG. 6, where the compensated inclination is variable). To modify the inclination, the base 101 may furthermore comprise servomotors.

The beam fan T", R" is a so called multi-beam which may be generated with the transmitter 105 and/or the deflector 104, wherein each beam of the multi-beam can be distinguished by the receiver 106. The circular arrow indicates the rotation of the multi-beam.

Figure 6:
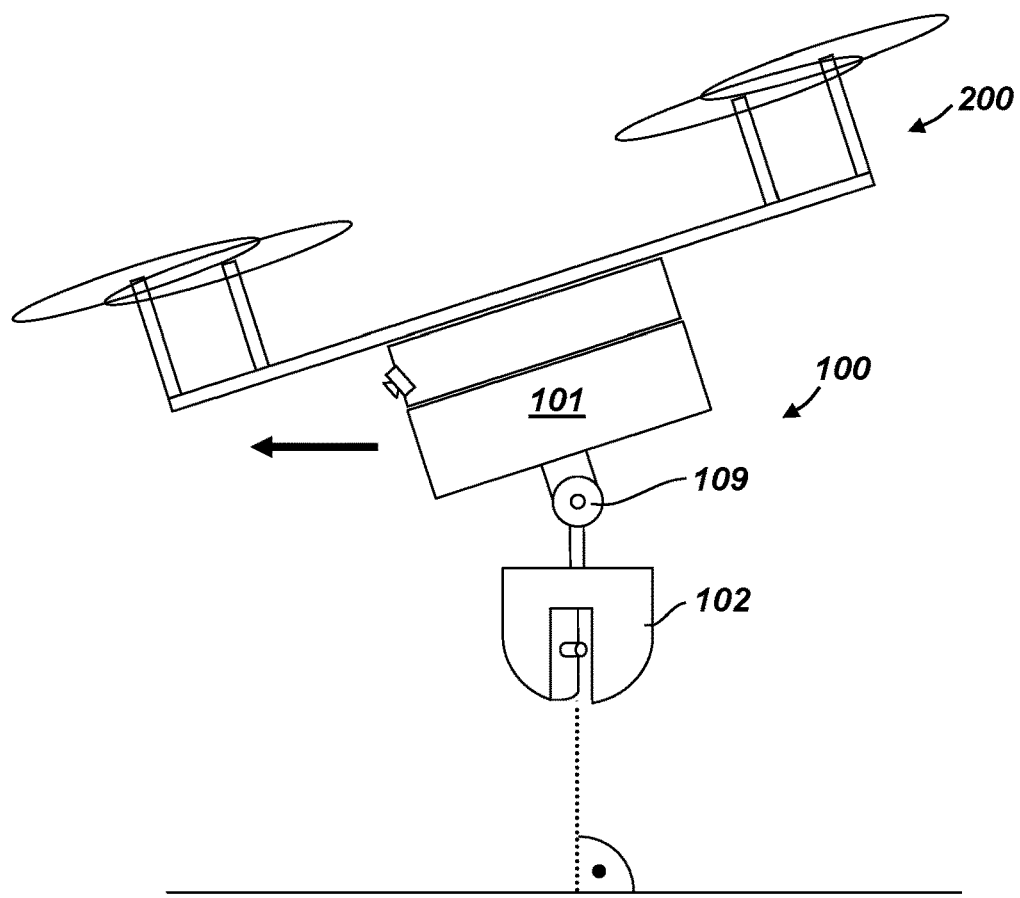
FIG. 6: shows a fourth embodiment of the profiler according to the invention, and, respectively, a forth embodiment of the UAV according to the invention comprising a profiler.

FIG. 6 shows a flying sensor according to the invention, comprising a joint 109 for swivelling the scanning unit 102, for example passively by gravity alone, or actively by a motor. An exemplary purpose may be to achieve an orthogonal orientation of the scanning unit 102 relative to the ground, no matter the current orientation of the UAV, as indicated in FIG. 7. The joint may also be a gimbal joint (a.k.a. cardan joint) allowing more manoeuvres to the UAV while keeping the orientation of the scanning unit constant.

Although the invention is illustrated above, partly with reference to some preferred embodiments, it must be understood that numerous modifications and combinations of different features of the embodiments can be made. All of these modifications lie within the scope of the appended claims.

The invention claimed is:
1. A flying sensor comprising:
an unmanned aerial vehicle (UAV); and
at least one profiler mounted on the UAV, wherein the at least one profiler comprises:
    a base; and
    a scanning unit configured for providing Light Detection And Ranging (LiDAR) data, the scanning unit mounted on the base and comprising:
        a shaft carrying a deflector, the shaft being mounted in the scanning unit and rotatable about a rotation axis,
        a first transmitter configured for transmitting a first transmission beam via the deflector towards a setting,
        a first receiver configured for receiving a first reception beam reflected from the setting via the deflector, and
        an electric port configured for connecting the profiler to the UAV, said electric port comprising a data interface and a power interface,
wherein the UAV comprises:
    a visual sensor for providing visual data, the visual sensor comprising one or more cameras,
    a pose sensor for providing pose data, the pose sensor comprising:
        an Inertial Measuring Unit (IMU), and
        a Global Navigation Satellite System (GNSS) sensor or a Pseudo GNSS sensor, and
    a computer configured to generate a 3D point cloud of the setting based on the LiDAR data and a Simultaneous Localisation and Mapping (SLAM) algorithm using the visual data and the pose data.

2. The flying sensor according to claim 1,
wherein the pose sensor is integrated in one single box, which is modularly
mounted on a main body of the UAV.

3. The flying sensor according to claim 1, wherein the profiler is mounted on a main body of the UAV in such a way that a nodal point of the scanning unit is positioned in a leveled state of the UAV and vertically below a central point of the GNSS sensor.

4. The flying sensor according to claim 1, wherein the scanning unit comprises:
second transmitter configured to transmit a second transmission beam via the deflector towards a setting, and
a second receiver configured to receive a second reception beam reflected from the setting via the deflector.

5. The flying sensor according to claim 4, wherein the second transmission beam is a transmission beam fan.

6. The flying sensor according to claim 1, wherein the first transmission beam is a transmission beam fan.

7. The flying sensor according to claim 6, wherein the SLAM algorithm is further using the aviation data.

8. The flying sensor according to claim 1, wherein the profiler further comprises at least one add-on scanning unit configured similar to the scanning unit.

9. The flying sensor according to claim 1, wherein the UAV comprises:
a plurality of propellers, and
an aviation unit configured for providing aviation data, the aviation data comprising data regarding at least one of a height and a velocity of the UAV, and
wherein the computer is configured for controlling the propellers based at least on the aviation data and the pose data.

10. The flying sensor according to claim 9, wherein the computer is configured for controlling the propellers further based on the LiDAR data and the visual data.

11. The flying sensor according to claim 1, wherein by the base, the profiler is configured to be mounted on one of:
an upper side,
a lateral side, and
a bottom side
of a main body of the UAV.

12. The flying sensor according to claim 1, wherein the scanning unit is mounted to the base by one of:
a pivot joint,
a gimbal joint, and
a ball joint.

13. The flying sensor according to claim 1, further comprising:
a wireless communication unit, wherein the computer is configured for receiving commands by a remote control via the wireless communication unit.

14. The flying sensor according to claim 1, wherein the power interface is configured to provide electric power from a battery of the UAV to the profiler.

15. The flying sensor according to claim 1, wherein the computer is configured for controlling at least one of:
a landing approach,
a collision avoidance,
hovering, and
automatic height control,
based at least in part on the LiDAR data, the visual data and the pose data.

16. The flying sensor according to claim 1, wherein the at least one camera of the visual sensor is one of:
a thermal infrared camera, and
a hyperspectral camera.

* * * * *